(12) United States Patent
Fukunaga et al.

(10) Patent No.: US 7,892,417 B2
(45) Date of Patent: Feb. 22, 2011

(54) CATALYST FOR REFORMING HYDROCARBON AND METHOD FOR PREPARATION THEREOF, AND PROCESS FOR REFORMING HYDROCARBON USING SAID CATALYST

(75) Inventors: Tetsuya Fukunaga, Chiba (JP); Tomoki Yanagino, Chiba (JP); Kozo Takatsu, Chiba (JP); Takashi Umeki, Chiba (JP)

(73) Assignee: Idemitsu Kosan, Co., Ltd., Tokyo (JP)

( * ) Notice: Subject to any disclaimer, the term of this patent is extended or adjusted under 35 U.S.C. 154(b) by 313 days.

(21) Appl. No.: 12/104,802

(22) Filed: Apr. 17, 2008

(65) Prior Publication Data
US 2008/0287727 A1    Nov. 20, 2008

Related U.S. Application Data

(62) Division of application No. 10/472,899, filed as application No. PCT/JP02/02922 on Mar. 26, 2002, now Pat. No. 7,378,368.

(30) Foreign Application Priority Data

| Mar. 29, 2001 | (JP) | ................... 2001-094813 |
| Aug. 2, 2001 | (JP) | ................... 2001-234349 |
| Aug. 24, 2001 | (JP) | ................... 2001-253995 |
| Jan. 18, 2002 | (JP) | ................... 2002-009876 |
| Mar. 11, 2002 | (JP) | ................... 2002-065076 |

(51) Int. Cl.
*C07C 1/00* (2006.01)
(52) U.S. Cl. ............. 208/134; 502/324; 502/325; 502/328; 502/330; 208/133; 208/135; 208/137; 208/138
(58) Field of Classification Search ......... 502/324–328, 502/330; 208/133–141
See application file for complete search history.

(56) References Cited

U.S. PATENT DOCUMENTS 3,207,704 A    9/1965    Stephens et al.

(Continued)

FOREIGN PATENT DOCUMENTS

EP    0 406 896    1/1991

(Continued)

OTHER PUBLICATIONS

Seung-Ho Seok, et al., "The role of MnO in Ni/MnO-$Al_2O_3$ catalysts for carbon dioxide reforming of methane", Applied Catalysis A: General, Elsevier Science, vol. 215, no. 1-2, XP-004246306, Jul. 13, 2001, pp. 31-38.

*Primary Examiner*—Robert J Hill, Jr.
*Assistant Examiner*—Brian McCaig
(74) *Attorney, Agent, or Firm*—Oblon, Spivak, McClelland, Maier & Neustadt, L.L.P.

(57) ABSTRACT

The present invention relates to a catalyst for reforming a hydrocarbon comprising a carrier containing manganese oxide and carried thereon (a) at least one component selected from a ruthenium component, a platinum component, a rhodium component, a palladium component, an iridium component and a nickel component and a process for producing the same and to a process for reforming a hydrocarbon (steam reforming, self thermal reforming, partial oxidation reforming and carbon dioxide reforming) using the above catalyst. Provided are a catalyst for reforming a hydrocarbon which comprises ruthenium, platinum, rhodium, palladium, iridium or nickel as an active component and in which a reforming activity is elevated, a process for producing the same, and a steam reforming process, a self thermal reforming process, a partial oxidation reforming process and a carbon dioxide reforming process for a hydrocarbon using the above catalyst.

10 Claims, 1 Drawing Sheet

U.S. PATENT DOCUMENTS

| | | | |
|---|---|---|---|
| 3,494,972 A | 2/1970 | Friedli | |
| 3,645,915 A | 2/1972 | Stiles et al. | |
| 3,701,822 A | 10/1972 | Negra et al. | |
| 3,804,902 A | 4/1974 | Sakakibara et al. | |
| 3,881,696 A | 5/1975 | Lepeytre et al. | |
| 3,894,965 A | 7/1975 | Foster et al. | |
| 3,894,967 A | 7/1975 | Koepernik et al. | |
| 4,123,391 A | 10/1978 | Noguchi et al. | |
| 4,200,552 A | 4/1980 | Noguchi et al. | |
| 4,206,134 A | 6/1980 | Kugler et al. | |
| 4,207,211 A * | 6/1980 | Russ et al. | 502/324 |
| 4,237,030 A | 12/1980 | Noguchi et al. | |
| 4,238,366 A | 12/1980 | Antos | |
| 4,389,335 A | 6/1983 | Merriam et al. | |
| 4,402,869 A | 9/1983 | Tauster et al. | |
| 4,452,854 A | 6/1984 | Merriam et al. | |
| 4,492,769 A | 1/1985 | Blanchard et al. | |
| 4,728,672 A | 3/1988 | Yoshinari et al. | |
| 4,780,300 A | 10/1988 | Yokoyama et al. | |
| 4,968,660 A | 11/1990 | Tijburg et al. | |
| 5,134,109 A * | 7/1992 | Uchiyama et al. | 502/324 |
| 5,141,912 A | 8/1992 | Ernest et al. | |
| 5,196,390 A | 3/1993 | Tauster et al. | |
| 5,262,129 A | 11/1993 | Terada et al. | |
| 5,296,435 A | 3/1994 | Kitaguchi et al. | |
| 5,476,828 A | 12/1995 | Kapteijn et al. | |
| 5,780,384 A | 7/1998 | Tomczak et al. | |
| 5,849,659 A | 12/1998 | Tanaka et al. | |
| 5,906,958 A | 5/1999 | Park et al. | |
| 6,025,403 A * | 2/2000 | Marler et al. | 518/703 |
| 6,121,189 A | 9/2000 | Campbell et al. | |
| 2002/0082164 A1 | 6/2002 | Dou et al. | |

FOREIGN PATENT DOCUMENTS

| | | |
|---|---|---|
| EP | 1 093 852 | 4/2001 |
| EP | 1 136 442 | 9/2001 |
| EP | 1 338 335 | 8/2003 |
| JP | 61-061637 | 3/1986 |
| JP | 03-109942 | 5/1991 |
| JP | 05-221602 | 8/1993 |
| JP | 06-015172 | 1/1994 |
| JP | 2000-001303 | 1/2000 |
| JP | 2002-126528 | 5/2002 |
| WO | WO 99/48596 | 9/1999 |
| WO | 99/64150 | 12/1999 |
| WO | WO 00/10698 | 3/2000 |
| WO | 02/38268 | 5/2002 |

* cited by examiner

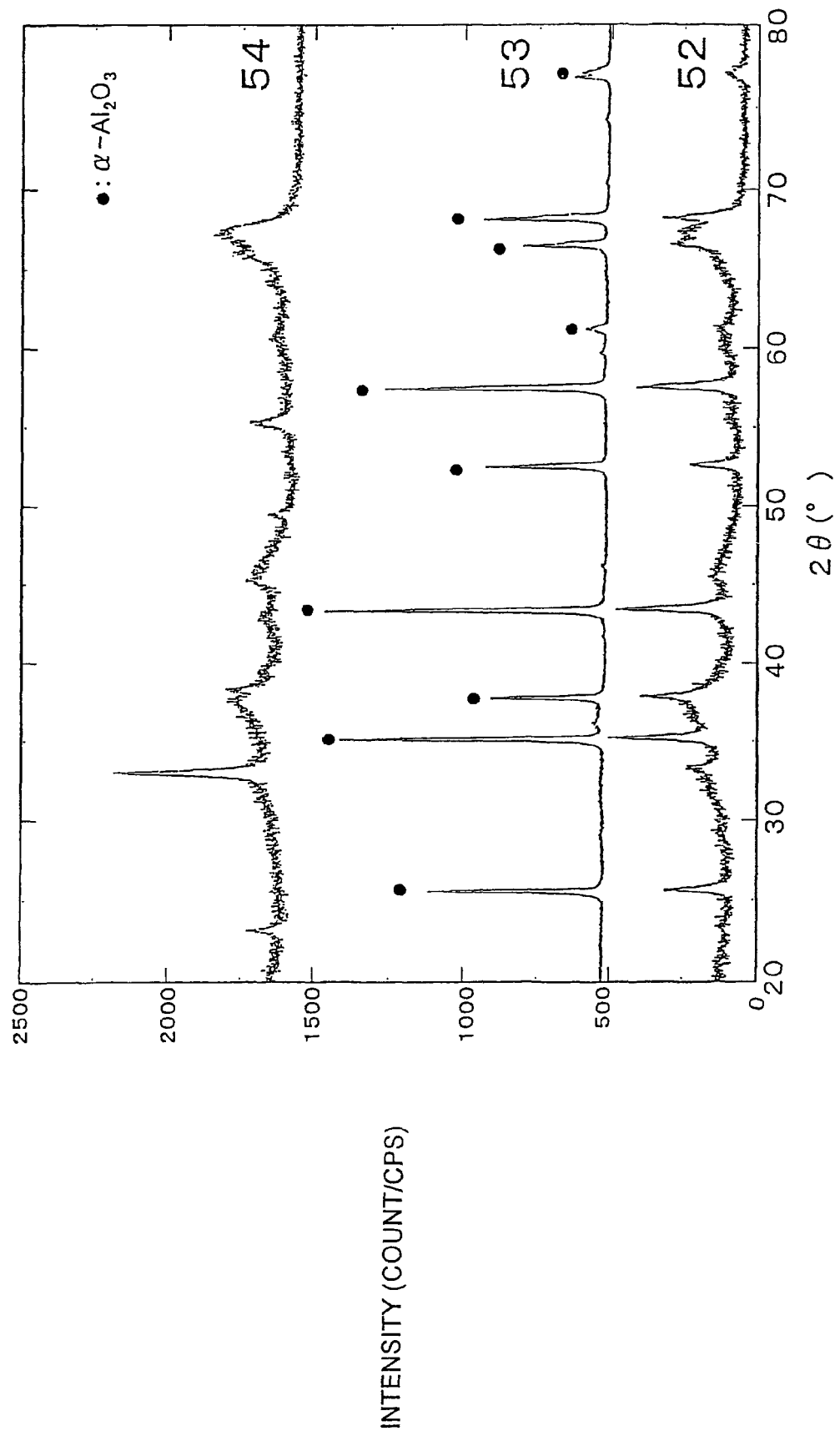

CATALYST FOR REFORMING HYDROCARBON AND METHOD FOR PREPARATION THEREOF, AND PROCESS FOR REFORMING HYDROCARBON USING SAID CATALYST

CROSS REFERENCE TO RELATED APPLICATIONS

This application is a divisional of U.S. patent application Ser. No. 10/472,899, filed Dec. 4, 2003, now U.S. Pat. No. 7,378,368, which is the U.S. national stage of International Application No. PCT/JP02/02922, filed Mar. 26, 2002, the disclosures of which are incorporated herein by reference in their entireties. This application claims priority to Japanese Patent Applications No. 2001-094813, filed Mar. 23, 2001, No. 2001-234349, filed Aug. 2, 2001, No. 2001-253995, filed Aug. 24, 2001, No. 2002-009876, filed Jan. 18, 2002, No. 2002-065076, filed Mar. 11, 2002, the disclosures of which are incorporated herein by reference in their entireties.

BACKGROUND

The present invention relates to a catalyst for reforming a hydrocarbon, a production process for the same and a process for reforming a hydrocarbon using the above catalyst, more specifically to a catalyst for reforming a hydrocarbon in which manganese oxide is used for a part of a carrier, a production process for the same and a process for steam reforming, self thermal reforming, partial oxidation reforming and carbon dioxide reforming for a hydrocarbon using the above catalyst.

In recent years, new energy technologies are spotlighted from the viewpoint of environmental problems, and a fuel cell attracts attentions as one of the new energy technologies. In this fuel cell, hydrogen is electrochemically reacted with oxygen to thereby convert chemical energy to electric energy, and it is characterized by having a high use efficiency of energy, so that researches for putting it to practical use are positively carried out for civil, industrial and automobile applications. In this fuel cell, types such as a phosphoric acid type, a molten carbonate type, a solid oxide type and a solid polymer type are known according to the kind of electrolytes used. On the other hand, used as a hydrogen source are methanol, a liquefied natural gas comprising mainly methane, a city gas comprising this natural gas as a principal component, a synthetic liquid fuel comprising a natural gas as a raw material and petroleum base hydrocarbons such as naphtha and kerosene.

When using these hydrocarbons to produce hydrogen, the above hydrocarbons are usually subjected to steam reforming treatment in the presence of a catalyst. In this case, a catalyst carried thereon with ruthenium as an active ingredient has so far been researched as a catalyst for steam reforming treatment of petroleum base hydrocarbons. It has the advantages that it has a relatively high activity and that carbon is inhibited from being deposited even under an operating condition of a low steam/carbon ratio, and in recent years, it is expected to be applied to a fuel cell requiring a catalyst having a long life.

On the other hand, since it has been found that cerium oxide and zirconium oxide have a promoter effect for a ruthenium catalyst, catalysts which are based on cerium oxide, zirconium oxide and ruthenium are researched, and several patents have been applied. For example, the case of cerium oxide includes Japanese Patent Publication No. 29633/1984, Japanese Patent Application Laid-Open No. 147242/1985, Japanese Patent Application Laid-Open No. 281845/1992, Japanese Patent Application Laid-Open No. 10586/1997, Japanese Patent Application Laid-Open No. 173842/1997, Japanese Patent Application Laid-Open No. 262486/1997, Japanese Patent Application Laid-Open No. 24235/1998and Japanese Patent Application Laid-Open No. 61307/2000. Further, the case of zirconium oxide includes Japanese Patent Application Laid-Open No. 168924/1993, Japanese Patent Application Laid-Open No. 208133/1993, Japanese Patent Application Laid-Open No. 220397/1993, Japanese Patent Application Laid-Open No. 261286/1993, Japanese Patent Application Laid-Open No. 88376/1995, Japanese Patent Application Laid-Open No. 48502/1996, Japanese Patent Application Laid-Open No. 196907/1996, Japanese Patent Application Laid-Open No. 29097/1997 and Japanese Patent Application Laid-Open No. 29098/1997. Further, catalysts based on platinum, rhodium, palladium, iridium and nickel in addition to ruthenium have been researched as well. However, they do not necessarily have a satisfactory activity as a steam reforming catalyst for hydrocarbons, and the problem that a large amount of carbon is deposited still remains.

In producing hydrogen, self thermal reforming treatment, partial oxidation reforming treatment and carbon dioxide reforming treatment in addition to steam reforming treatment have been researched as well, and it is known that in general, all the reforming treatments described above can be carried out with the same reforming catalyst. Further, it is known as well that a synthetic gas can be produced by all the reforming treatments described above by changing a little the conditions. Ruthenium, platinum, rhodium, palladium, iridium and nickel as a catalyst have been researched for the self thermal reforming treatment, the partial oxidation reforming treatment and the carbon dioxide reforming treatment each described above, but they are still unsatisfactory in terms of an activity.

SUMMARY

The present invention has been made under the situation described above, and the following items are objects thereof.

1. Provided are a steam reforming catalyst which comprises ruthenium as an active ingredient and which is improved in a steam reforming activity of various hydrocarbons and decreased in a deposit amount of carbon, a production process for the same and a steam reforming process for a hydrocarbon using the above catalyst.

2. Provided are a catalyst for reforming a hydrocarbon which comprises ruthenium, platinum, rhodium, palladium, iridium or nickel as an active ingredient and which is improved in a reforming activity, a production process for the same and a steam reforming process, a self thermal reforming process, a partial oxidation reforming process and a carbon dioxide reforming process for a hydrocarbon using the above catalyst.

Intensive researches repeated by the present inventors have resulted in finding that the objects of the present invention described above can effectively be achieved by using manganese oxide for a part or the whole of a carrier, and thus they have come to complete the present invention.

That is, the present invention comprises the following essentials.

1. A catalyst for reforming a hydrocarbon comprising a carrier containing manganese oxide and carried thereon (a) at least one component selected from a ruthenium component, a platinum component, a rhodium component, a palladium component, an iridium component and a nickel component.

2. The catalyst for reforming a hydrocarbon as described in the above item 1, further comprising carried on the carrier, (b)

a cobalt component and/or (c) at least one component selected from an alkaline metal component, an alkaline earth metal component and a rare earth metal component.

3. The catalyst for reforming a hydrocarbon as described in the above item 1 or 2, wherein manganese oxide contained in the carrier has a content of 5 to 95 mass %.

4. The catalyst for reforming a hydrocarbon as described in any of the above items 1 to 3, wherein the carrier comprises manganese oxide and alumina.

5. The catalyst for reforming a hydrocarbon as described in the above item 4, wherein a diffraction peak of an α-alumina phase is present in the alumina in X ray diffraction.

6. The catalyst for reforming a hydrocarbon as described in any of the above items 1 to 5, wherein a carrying amount of at least one component selected from the ruthenium component, the platinum component, the rhodium component, the palladium component and the iridium component is 0.1 to 8 mass parts in terms of metal per 100 mass parts of the carrier.

7. The catalyst for reforming a hydrocarbon as described in any of the above items 1to 5, wherein a carrying amount of the nickel component is 5 to 70 mass parts in terms of metal per 100 mass parts of the carrier.

8. A process for producing a catalyst for reforming a hydrocarbon characterized by adding a manganese compound to alumina calcined at a temperature falling in a range of 850 to 1,200 ° C. to prepare a carrier comprising manganese oxide and alumina and carrying (a) at least one component selected from a ruthenium component, a platinum component, a rhodium component, a palladium component, an iridium component and a nickel component on the carrier.

9. A process for producing a catalyst for reforming a hydrocarbon characterized by calcining alumina carried thereon with manganese oxide at a temperature falling in a range of 850 to 1,200 ° C. to prepare an alumina carrier containing manganese oxide and carrying (a) at least one component selected from a ruthenium component, a platinum component, a rhodium component, a palladium component, an iridium component and a nickel component on the carrier.

10. A process for producing a catalyst for reforming a hydrocarbon by carrying (a) at least one component selected from a ruthenium component, a platinum component, a rhodium component, a palladium component, an iridium component and a nickel component on a carrier containing manganese oxide, wherein the carrier containing manganese oxide is prepared by dissolving a manganese compound in water in which a dissolving water amount ratio is controlled to a range of 0.7 to 1.3 to prepare an aqueous solution, impregnating the carrier with the aqueous solution and then calcining it.

11. The process for producing a catalyst for reforming as described in the above item 10, wherein the carrier comprises manganese oxide and alumina.

12. A steam reforming process for a hydrocarbon using the catalyst for reforming a hydrocarbon as described in any of the above items 1 to 7.

13. A self thermal reforming process for a hydrocarbon using the catalyst for reforming a hydrocarbon as described in any of the above items 1 to 7.

14. A partial oxidation reforming process for a hydrocarbon using the catalyst for reforming a hydrocarbon as described in any of the above items 1 to 7.

15. A carbon dioxide reforming process for a hydrocarbon using the catalyst for reforming a hydrocarbon as described in any of the above items 1 to 7.

16. A steam reforming catalyst for a hydrocarbon comprising a carrier containing manganese oxide and carried thereon (a) a ruthenium component.

17. The steam reforming catalyst for a hydrocarbon as described in the above item 16, further comprising carried on the carrier, (b) at least one component selected form a cobalt component and/or a nickel component and/or (c) at least one component selected from an alkaline metal component, an alkaline earth metal component and a rare earth metal component.

18. The steam reforming catalyst for a hydrocarbon as described in the above item 16 or 17, wherein the carrier comprises manganese oxide and alumina.

19. The steam reforming catalyst for a hydrocarbon as described in any of the above items 16 to 18, wherein a carrying amount of the ruthenium component is 0.1 to 8 mass parts in terms of metallic ruthenium per 100 mass parts of the carrier.

20. A steam reforming process for a hydrocarbon using the steam reforming catalyst for a hydrocarbon as described in any of the above items 16 to 19.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIG. 1 shows X ray diffraction diagrams of Catalysts 52, 53 and 54. That of the catalyst 53 is shown in a scale of one third of the original intensity.

DETAILED DESCRIPTION OF EXEMPLARY EMBODIMENTS

The present invention shall be explained below in details.

The catalyst for reforming a hydrocarbon of the present invention comprises a carrier containing manganese oxide and carried thereon (a) at least one component selected from a ruthenium component, a platinum component, a rhodium component, a palladium component, an iridium component and a nickel component, and it further comprises carried on the carrier, (b) a cobalt component and/or (c) at least one component selected from an alkaline metal component, an alkaline earth metal component and a rare earth metal component.

First, the process for producing the catalyst described above shall be explained.

$MnO$, $Mn_3O_4$, $Mn_2O_3$, $MnO_2$, $MnO_3$ and $Mn_2O_7$ can be used as manganese oxide for the carrier, and tetravalent manganese dioxide ($MnO_2$) is preferred from the viewpoints of availability and stability. Commercially available manganese oxide can be used as this $MnO_2$, and capable of being used as well are those obtained by calcining manganese acetate [$Mn(CH_3COO)_2.4H2O$], manganese sulfate [$MnSO_4.5H_2O$], manganese nitrate [$Mn(NO_3)_2.6H_2O$] and manganese chloride [$MnCl_2.4H_2O$]. Manganese oxide 100% also can be used as the carrier, but a carrier such as alumina, silica-alumina and titania is preferably used in combination therewith from the viewpoint of a strength of the catalyst.

In this case, an amount of manganese oxide contained in the carried is preferably 5 to 95 mass %. If it is less than 5 mass %, the effect of manganese oxide is not displayed in a certain case. On the other hand, it exceeds 95 mass %, a reduction in a surface area of the catalyst and a reduction in the catalyst strength is brought about in a certain case. Accordingly, both are not preferred.

Alumina out of the carriers used in combination is particularly preferred. Commercially available alumina having any crystal form of α, β, γ, η, θ, κ and χ can be used as such alumina, and a-alumina or alumina containing an α-alumina phase is preferred in terms of an activity of the catalyst. When alumina other than α-alumina is used as the raw material, it may be turned, as described later, into α-alumina in a stage of preparing the catalyst to obtain alumina containing an α-alumina phase.

Further, those obtained by calcining alumina hydrate such as boehmite, vialite and gibcite can be used as well. In addition thereto, there may be used a compound obtained by adding an alkaline buffer solution having a pH of 8 to 10 to aluminum nitrate to produce a precipitate of a hydroxide and calcining it, or aluminum chloride may be calcined. Further, capable of being used as well is a compound prepared by a sol-gel method in which alkoxide such as aluminum isopropoxide is dissolved in alcohol such as 2-propanol and in which inorganic acid such as hydrochloric acid is added thereto as a catalyst for hydrolysis to prepare an alumina gel and it is dried and calcined.

When using manganese oxide in combination with alumina, manganese oxide and alumina may be used in a mixture, and it can be prepared as well by impregnating alumina with an aqueous solution of a manganese compound such as manganese acetate [$Mn(CH_3COO)_2.4H_2O$], manganese sulfate [$MnSO_4.5H_2O$], manganese nitrate [$Mn(NO_3)_2.6H_2O$] and manganese chloride [$MnCl_2.4H_2O$] and then calcining.

When impregnating alumina with the aqueous solution of the manganese compound described above to carry manganese oxide, an amount of water dissolving the manganese compound is preferably controlled so that a dissolving water amount ratio falls in a range of 0.7 to 1.3.

The dissolving water amount ratio described above is determined from the following equation (1):

dissolving water amount ratio=[water amount (ml) used]/[dissolving water amount (ml)]  (1)

In this case, the water amount used includes water coming from crystal water of the manganese compound. The dissolving water amount means an absorbing water amount of the alumina carrier and is determined from the following equation (2):

dissolving water amount (ml)=[pore volume (ml/g) of carrier]×[carrier amount (g)]  (2)

In this case, the pore volume of the alumina carrier is determined by a mercury penetration method. The alumina carrier used in the present invention had a pore volume of KHO-24; 0.42 ml/g, NA-3; 1.25 ml/g.

When impregnating with the manganese compound dividing into several times, the dissolving water amount ratio falls preferably in a range of 0.7 to 1.3 every time.

Alumina as the carrier has been described above, and the same shall apply as well to the case of a carrier other than alumina, for example, silica, silica-alumina and titania. Further, alumina or alumina carried thereon with the manganese compound is calcined preferably at a temperature falling in a range of 850 to 1,200° C. in terms of a catalyst activity. The calcining atmosphere is oxygen or air, and in addition thereto, it may be inert gas such as nitrogen and argon according to the kind of the manganese compound. The temperature falls preferably in a range of 900 to 1,000° C. That is, either of alumina which is a raw material for the carrier and alumina carried thereon with the manganese compound may be treated at a high temperature of 850 to 1,200° C., or both may be treated at a high temperature. From an economical point of view, alumina carried thereon with the manganese compound is better treated at a high temperature. If the temperature is lower than 850° C., the effect of raising the catalyst activity is not exhibited in a certain case. On the other hand, if it exceeds 1,200° C., the carrier is sintered too much, and the surface area is decreased, so that the catalyst activity is reduced in a certain case.

When α-alumina is not used as the raw material alumina, a part or the whole thereof is turned into α-alumina by the high temperature treatment described above. This can be confirmed by the presence of a diffraction peak of an α-alumina phase by carrying out powder X ray diffraction measurement of the catalyst on the following conditions.

Preparation of sample: the catalyst is crushed in an agate mortar and put on a glass-made holder. Apparatus: RAD-B system manufactured by Rigaku Co., Ltd.

Condition: 2. theta.=4 to 84 deg

Tube current and voltage: 40 kV and 40 mA (CuK α ray) step scanning system

Step width: 0.02 deg

Sampling time: 1 sec

Removing of background: none

Next, carried on the carrier containing manganese oxide is (a) at least one component selected from the ruthenium component, the platinum component, the rhodium component, the palladium component, the iridium component and the nickel component, and further carried thereon, if necessary, are (b) the cobalt component and/or (c) at least one component selected from an alkaline metal component, an alkaline earth metal component and a rare earth metal component.

In the carrying operation, using a solution in which the component (a), the components (a) and (b), the components (a) and (C) or the components (a), (b) and (C) are dissolved, the components may be carried sequentially and separately, and they are carried preferably at the same time from an economical point of view.

Capable of being used for the carrying operation are various impregnating methods such as a hot impregnating method, a cold impregnating method, a vacuum impregnating method, an atmospheric pressure impregnating method, an impregnation drying method and a pore filing method and various methods such as a dipping method, a minor wetting method, a wet adsorbing method, a spraying method and a coating method, and the impregnating method is preferred.

In respect to the conditions in the carrying operation, carrying can suitably be carried out under atmospheric pressure or reduced pressure as has so far been carried out. In this case, the operating temperature shall not specifically be restricted, and the operation can be carried out at room temperature or in the vicinity of room temperature, or carrying can suitably be carried out at, for example, room temperature to 150° C., if necessary, under heating. The contact time is one minute to 10 hours.

The ruthenium compound which is a source for the component (a) includes, for example, ruthenium salts such as $RuCl_3.nH_2O$, $Ru(NO_3)_3$, $Ru_2(OH)_2Cl_4.7NH_3.3H_2O$, $K_2(RuCl_5(H_2O))$, $(NH_4)_2(RuCl_5(H_2O))$, $K_2(RuCl_5(NO))$, $RuBr_3.nH_2O$, $Na_2RuO_4$, $Ru(NO)(NO_3)_3$, $(Ru_3O(OAc)_6 (H_2O)_3)OAc.nH_2O$, $K_4(Ru(CN)_6).nH_2O$, $K_2(Ru(NO_2)_4 (OH)(NO))$, $(Ru(NH_3)_6)Cl_3$, $(Ru(NH_3)_6)Br_3$, $(Ru(NH_3)_6)Cl_2$, $(Ru(NH_3)_6)Br_2$, $(Ru_3O_2(NH_3)_{14})Cl_6.H_2O$, $(Ru(NO)(NH_3)_5)Cl_3$, $(Ru(OH)(NO)(NH_3)_4)(NO_3)_2$, $RuCl_2(PPh_3)_3$, $RuCl_2(PPh_3)_4$, $(RuClH(PPh_3)_3).C_7H_8$, $RuH_2(PPh_3)_4$, $RuClH(CO)(PPh_3)_3$, $RuH_2(CO)(PPh_3)_3$, $(RuCl_2(cod))_n$, $Ru(CO)_{12}$, $Ru(acac)_3$, $(Ru(HCOO)(CO)_2)_n$ and $Ru_2I_4$(p-cymene)$_2$ These compounds may be used alone or in combination of two or more kinds thereof. $RuCl_3 \cdot nH_2O$, $Ru(NO_3)_3$ and $Ru_2(OH)_2Cl_4 \cdot 7NH_3 \cdot 3H_2O$ are preferably used in terms of handling.

The platinum compound which is a source for the component (a) includes $PtCl_4$, $H_2PtCl_6$, $Pt(NH_3)_4Cl_2$, $(NH_4)_2PtCl_2$, $H_2PtBr_6$, $NH_4[Pt(C_2H_4)Cl_3]$, $Pt(NH_3)_4(OH)_2$ and $Pt(NH_3)_2(NO_2)_2$.

The rhodium compound which is a source for the component (a) includes $Na_3RhCl_6$, $(NH_4)_2RhCl_6$, $Rh(NH_3)_5Cl_3$ and $RhCl_3$.

The palladium compound which is a source for the component (a) includes $(NH_4)_2PdCl_6$, $(NH_4)_2PdCl_4$, $Pd(NH_3)_4Cl_2$, $PdCl_2$ and $Pd(NO_3)_2$.

The iridium compound which is a source for the component (a) includes $(NH_4)_2IrdCl_6$, $IrCl_3$ and $H_2IrCl_6$.

The nickel compound which is a source for the component (a) includes $Ni(NO_3)_2$, $NiSO_4$, $NiCl_2$, $Ni(OH)_2$ and $Ni(CH_3COO)_2$ Among the components described above, the ruthenium components are preferred in terms of the catalyst activity.

The cobalt compound which is a source for the component (b) includes $Co(NO_3)_2$, $Co(OH)_2$, $CoCl_2$, $CoSO_4$, $CO_2(SO_4)_3$ and $CoF_3$.

Potassium, cesium, rubidium, sodium and lithium are suitably used as the alkaline metal component out of the components (c).

Compounds for the alkaline metal component source include, for example, K salts such as $K_2B_{10}O_{16}$, $KBr$, $KBrO_3$, $KCN$, $K_2CO_3$, $KCl$, $KClO_3$, $KClO_4$, $KF$, $KHCO_3$, $KHF_2$, $KH_2PO_4$, $KH_5(PO_4)_2$, $KHSO_4$, $KI$, $KIO_3$, $KIO_4$, $K_4I_2O_9$, $KN_3$, $KNO_2$, $KNO_3$, $KOH$, $KPF_6$, $K_3PO_4$, $KSCN$, $K_2SO_3$, $K_2SO_4$, $K_2S_2O_3$, $K_2S_2O_5$, $K_2S_2O_6$, $K_2S_2O_8$ and $K(CH_3COO)$; Cs salts such as $CsCl$, $CsClO_3$, $CsClO_4$, $CsHCO_3$, $CsI$, $CsNO_3$, $Cs_2SO_4$, $Cs(CH_3COO)$, $Cs_2CO_3$ and $CsF$; Rb salts such as $Rb_2B_{10}O_{16}$, $RbBr$, $RbBrO_3$, $RbCl$, $RbClO_3$, $RbClO_4/RbI$, $RbNO_3$, $Rb_2SO_4$, $Rb(CH_3COO)_2$ and $Rb_2CO_3$; Na salts such as $Na_2B_4O_7$, $NaB_{10}O_{16}$, $NaBr$, $NaBrO_3$, $NaCN$, $Na_2CO_3$, $NaCl$, $NaClO$, $NaClO_3$, $NaClO_4$, $NaF$, $NaHCO_3$, $NaHPO_3$, $Na_2HPO_3$, $Na_2HPO_4$, $NaH_2PO_4$, $Na_3HP_2O_6$, $Na_2H_2P_2O_7$, $NaI$, $NaIO_3$, $NaIO_4$, $NaN_3$, $NaNO_2$, $NaNO_3$, $NaOH$, $Na_2PO_3$, $Na_3PO_4$, $Na_4P_2O_7$, $Na_2S$, $NaSCN$, $Na_2SO_3$, $Na_2SO_4$, $Na_2S_2O_5$, $Na_2S_2O_6$ and $Na(CH_3COO)$; and Li salts such as $LiBO_2$, $Li_2B_4O_7$, $LiBr$, $LiBrO_3$, $Li_2CO_3$, $LiCl$, $LiClO_3$, $LiClO_4$, $LiHCO_3$, $Li_2HPO_3$, $LiI$, $LiN_3$, $LiNH_4SO_4$, $LiNO_2$, $LiNO_3$, $LiOH$, $LiSCN$, $Li_2SO_4$ and $Li_3VO_4$.

Barium, calcium, magnesium and strontium are suitably used as the alkaline earth metal component out of the components (c).

Compounds for the alkaline earth metal component source include Ba salts such as $BaBr_2$, $Ba(BrO_3)_2$, $BaCl_2$, $Ba(ClO_2)_2$, $Ba(ClO_3)_2$, $Ba(ClO_4)_2$, $BaI_2$, $Ba(N_3)_2$, $Ba(NO_2)_2$, $Ba(NO_3)_2$, $Ba(OH)_2$, $BaS$, $BaS_2O_6$, $BaS_4O_6$ and $Ba(SO_3NH_2)_2$; Ca salts such as $CaBr_2$, $CaI_2$, $CaCl_2$, $Ca(ClO_3)_2$, $Ca(IO_3)_2$, $Ca(NO_2)_2$, $Ca(NO_3)_2$, $CaSO_4$, $CaS_2O_3$, $CaS_2O_6$, $Ca(SO_3NH_2)_2$, $Ca(CH_3COO)_2$ and $Ca(H_2PO_4)_2$; Mg salts such as $MgBr_2$, $MgCO_3$, $MgCl_2$, $Mg(ClO_3)_2$, $MgI_2$, $Mg(IO_3)_2$, $Mg(NO_2)_2$, $Mg(NO_3)_2$, $MgSO_3$, $MgSO_4$, $MgS_2O_6$, $Mg(CH_3COO)_2$, $Mg(OH)_2$ and $Mg(ClO_4)_2$; and Sr salts such as $SrBr_2$, $SrCl_2$, $SrI_2$, $Sr(NO_3)_2$, $SrO$, $SrS_2O_3$, $SrS_2O_6$, $SrS_4O_6$, $Sr(CH_3COO)_2$ and $Sr(OH)_2$.

Yttrium, lanthanum and cerium are suitably-used as the rare earth metal component out of the components (c).

Compounds for the rare earth metal component source include $Y_2(SO_4)_3$, $YCl_3$, $Y(OH)_3$, $Y_2(CO_3)_3$, $Y(NO_3)_3$, $La_2(SO_4)_3$, $La(CO_3)_3$, $LaCl_3$, $La(OH)_3$, $La_2(CO_3)_3$, $La(CH_3COO_3)_3$, $Ce(OH)_3$, $CeI_3$, $Ce_2(SO_4)_3$, $Ce_2(CO_3)_3$ and $Ce(NO_3)_3$.

A carrying amount of at least one component selected from the ruthenium component, the platinum component, the rhodium component, the palladium component and the iridium component out of the components (a) described above is preferably 0.1 to 8 mass parts, more preferably 0.5 to 5 mass parts in terms of metal per 100 mass parts of the carrier. A carrying amount of the nickel component out of the components (a) is preferably 5 to 70 mass parts, more preferably 10 to 50 mass parts in terms of metal per 100 mass parts of the carrier.

A carrying amount of the component (b) is preferably 0.1 to 20 mass parts, more preferably 0.5 to 10 mass parts in terms of metal per 100 mass parts of the carrier.

A carrying amount of the component (c) is preferably 1 to 20 mass parts, more preferably 2 to 10 mass parts in terms of metal per 100 mass parts of the carrier.

After finishing the carrying operation described above, the catalyst is dried. The drying method includes, for example, natural drying and drying by means of a rotary evaporator or a blowing dryer.

In preparing the reforming catalyst, usually drying is carried out, and then calcining is carried out. In this case, calcining of the component (a) which is the catalyst active component at a high temperature brings about scattering, oxidation and coagulation thereof to become a factor which reduces the catalyst activity in a certain case, and therefore calcining is preferably not carried out after the component (a) is carried.

When calcining is not carried out, a new step for decomposing the respective component salts carried is preferably combined. This is to prevent the components carried in the forms of chloride and nitrate from being decomposed in a reactor and flowing out. The decomposition step includes a method in which the carrier is heated under a non-oxygen atmosphere (nitrogen, hydrogen and the like) and a method in which the carried components are converted to hydroxides by reacting in an alkaline aqueous solution. Among them, the method using an alkaline aqueous solution is easier. In this case, the alkaline aqueous solution shall not specifically be restricted as long as it shows alkalinity, and it includes, for example, an ammonia aqueous solution and aqueous solutions of alkaline metals and alkaline earth metals. In particular, hydroxides of alkaline metals such as potassium hydroxide and sodium hydroxide are preferably used. The alkaline aqueous solution having a high concentration is preferably used in the decomposition step in this alkaline aqueous solution.

When calcining is carried out, calcining is carried out at 400 to 800° C., preferably 450 to 800° C. for 2 to 6 hours, preferably 2 to 4 hours in the air or an inert gas (nitrogen, argon or the like).

The form and the size of the catalyst prepared in the manner described above shall not specifically be restricted, and capable of being used are those having various forms and structures which are usually used, such as a powder, a sphere, a particle, a honeycomb, a foamed matter, a fiber, a cloth, a plate and a ring.

The catalyst prepared above can be used without subjecting to reduction, but it is subjected preferably to reducing treatment in terms of the catalyst activity. Used for this reducing treatment are a gas phase reducing method in which treatment is carried out in gas flow containing hydrogen and a wet reducing method in which treatment is carried out with a reducing agent. The former gas phase reducing method is carried out usually at a temperature of 500 to 800° C., preferably 600 to 700° C. for 1 to 24 hours, preferably 3 to 12 hours in gas flow containing hydrogen.

The latter wet reducing method includes Birch reduction using liquid ammonia/alcohol/Na and liquid ammonia/alcohol/Li, Benkeser reduction using methylamine/Li and a method treating with a reducing agent such as Zn/HCl, Al/NaOH/$H_2O$, NaH, $LiAlH_4$ and substitution products thereof, hydrosilanes, sodium boron hydride and substitution products thereof, diborane, formic acid, formalin and hydrazine. In this case, these methods are carried out usually at a room temperature to 100° C. for 10 minutes to 24 hours, preferably 30 minutes to 10 hours.

First, the steam reforming reaction for a hydrocarbon using the reforming catalyst of the present invention shall be explained.

The raw material hydrocarbon used for this reaction includes, for example, various hydrocarbons including linear or branched saturated hydrocarbons having 1 to 16 carbon atoms such as methane, ethane, propane, butane, pentane, hexane, heptane, octane, nonane and decane, alicyclic saturated hydrocarbons such as cyclohexane, methylcyclohexane and cyclooctane, monocyclic and polycyclic aromatic hydrocarbons, city gas, LPG, naphtha and kerosene.

In general, when a sulfur content is present in these raw material hydrocarbons, they are preferably passed through a desulfurizing step to carry out desulfurization until the sulfur content becomes 0.1 ppm or less. If the sulfur content in the raw material hydrocarbons is more than 0.1 ppm, it causes deactivation of the steam reforming catalyst in a certain case. The desulfurizing method shall not specifically be restricted, and hydrogenating desulfurization and adsorbing desulfurization can suitably be adopted. Steam used for the steam reforming reaction shall not specifically be restricted.

In respect to the reaction conditions, the hydrocarbon amount and the steam amount may be determined so that steam/carbon (mole ratio) is 1.5 to 10, preferably 1.5 to 5 and more preferably 2 to 4. Thus, controlling of steam/carbon (mole ratio) makes it possible to efficiently obtain a product gas having a large hydrogen content.

The reaction temperature is usually 200 to 900° C., preferably 250 to 900° C. and more preferably 300 to 800° C. The reaction pressure is usually 0 to 3 MPa·G, preferably 0 to 1 MPa·G.

When using kerosene or hydrocarbon having a higher boiling point than that of kerosene as the raw material, steam reforming is advisably carried out while maintaining an inlet temperature of a steam reforming catalyst layer at 630° C. or lower, preferably 600° C. or lower. If the inlet temperature exceeds 630° C., heat decomposition of the hydrocarbon is promoted, and carbon is deposited on the catalyst or a reactor wall through a resulting radical to make operation difficult in a certain case. An outlet temperature of the catalyst layer shall not specifically be restricted and falls preferably in a range of 650 to 800 ° C. If it is lower than 650° C., a producing amount of hydrogen is likely to be unsatisfactory, and if it exceeds 800° C., the reactor requires a heat resistant material in a certain case, and therefore it is not preferred from an economical point of view.

Production of hydrogen is a little different in reaction conditions from production of a synthetic gas. In the case of producing hydrogen, steam is used in a little excess; the reaction temperature is a little low; and the reaction pressure is a little low. In contrast with this, in the case of producing synthetic gas, steam is used in a little low amount; the reaction temperature is a little high; and the reaction pressure is a little high.

Next, the self thermal reforming reaction, the partial oxidation reforming reaction and the carbon dioxide reforming reaction for a hydrocarbon using the reforming catalyst of the present invention shall be explained.

In the self thermal reforming reaction, oxidation reaction of a hydrocarbon and reaction of the hydrocarbon with steam take place in the same reactor or serial reactors. Production of hydrogen is a little different in reaction conditions from production of synthetic gas; usually, the reaction temperature is 200 to 1,300° C., preferably 400 to 1,200° C. and more preferably 500 to 900° C.; steam/carbon (mole ratio) is usually 0.1 to 10, preferably 0.4 to 4; oxygen/carbon (mole ratio) is usually 0.1 to 1, preferably 0.2 to 0.8; and the reaction pressure is usually 0 to 10 MPa·G, preferably 0 to 5 MPa·G and more preferably 0 to 3 MPa·G. The same hydrocarbon as in the steam reforming reaction is used.

In the partial oxidation reforming reaction, partial oxidation reaction of a hydrocarbon takes place. Production of hydrogen is a little different in reaction conditions from production of a synthetic gas; usually, the reaction temperature is 350 to 1,200° C., preferably 450 to 900° C.; oxygen/carbon (mole ratio) is usually 0.4 to 0.8, preferably 0.45 to 0.65; and the reaction pressure is usually 0 to 30 MPa·G, preferably 0 to 5 MPa–G and more preferably 0 to 3 MPa·G. The same hydrocarbon as in the steam reforming reaction is used.

In the carbon dioxide reforming reaction, reaction of a hydrocarbon with carbon dioxide takes place. Production of hydrogen is a little different in reaction conditions from production of a synthetic gas; usually, the reaction temperature is 200 to 1,300° C., preferably 400 to 1,200° C. and more preferably 500 to 900° C.; and carbon dioxide/carbon (mole ratio) is usually 0.1 to 5, preferably 0.1 to 3. When using steam, steam/carbon (mole ratio) is usually 0.1 to 10, preferably 0.4 to 4. When using oxygen, oxygen/carbon (mole ratio) is usually 0.1 to 1, preferably 0.2 to 0.8. The reaction pressure is usually 0 to 10 MPa·G, preferably 0 to 5 MPa·G and more preferably 0 to 3 MPa·G. Methane is usually used as the hydrocarbon, and the same hydrocarbon as in the steam reforming reaction is used.

A reaction system in the reforming reactions described above may be either of a continuous flow system and a batch system, and the continuous flow system is preferred. When using the continuous flow system, a liquid space velocity (LHSV) of the hydrocarbon is usually 0.1 to 10 $hr^{-1}$, 0.25 to 5 $hr^{-1}$ When gas such as methane is used as the hydrocarbon, the gas space velocity (GHSV) is usually 200 to 100,000 $hr^{-1}$.

The reaction system shall not specifically be restricted, and any of a fixed bed system, a moving bed system and a fluidized bed system can be used. The fixed bed system is preferred. The form of the reactor shall not specifically be restricted, and a tubular type reactor can be used.

The steam reforming reaction, the self thermal reforming reaction, the partial oxidation reforming reaction and the carbon dioxide reforming reaction for a hydrocarbon are carried out on the conditions described above using the reforming catalyst of the present invention, whereby a mixture containing hydrogen can be obtained and suitably used for a production process of hydrogen for a fuel cell. Further, a synthetic gas for methanol synthesis, oxo synthesis, dimethyl ether synthesis and Fischer-Tropsch synthesis can efficiently be obtained as well.

Next, the present invention shall specifically be explained with reference to examples, but the present invention shall by no means be restricted to these examples.

CATALYST PREPARATION EXAMPLES

[Catalyst 1]

Dissolved in 10 ml of demineralized water was 9.49 g of manganese acetate [$Mn(CH_3COO)_2 \cdot 4H_2O$, manufactured by "Wako Pure Chemicals Industries, Ltd."], and 30 g of an alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in a muffle furnace to prepare the alumina carrier containing 10 mass % of manganese oxide.

Next, 33 g of the carrier described above was impregnated with an aqueous solution prepared by dissolving 0.85 g of ruthenium chloride ($RuCl_3 \cdot nH_2O$, Ru content: 39.16 mass %, manufactured by "TANAKA PRECIOUS METALS") in 13 ml of demineralized water, and then it was dried at 80° C. for 3 hours by means of a rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 2]

Dissolved in 10 ml of demineralized water was 9.49 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 10 mass % of manganese oxide.

Next, 33 g of the carrier described above was impregnated with an aqueous solution prepared by dissolving 0.86 g of ruthenium chloride ($RuCl_3 \cdot nH_2O$, Ru content: 39.16 mass %, manufactured by "TANAKA PRECIOUS METALS") and 1.69 g of cobalt nitrate [$Co(NO_3)_2 \cdot 6H_2O$, manufactured by "Wako Pure Chemicals Industries, Ltd."] in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compounds impregnated thereinto. Then, the catalyst was washed well with distilled water and dried again at 80° C. for 3 hours by means of the rotary evaporator to obtain the catalyst. The composition of this catalyst is shown in Table 1.

[Catalyst 3]

Dissolved in 10 ml of demineralized water was 9.49 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 10 mass % of manganese oxide.

Next, 33 g of the carrier described above was impregnated with an aqueous solution prepared by dissolving 0.87 g of ruthenium chloride ($RuCl_3 \cdot nH_2O$, Ru content: 39.16 mass %, manufactured by "TANAKA PRECIOUS METALS") and 4.41 g of magnesium nitrate [$Mg(NO_3)_2 \cdot 6H_2O$, manufactured by "Wako Pure Chemicals Industries, Ltd."] in 12 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compounds impregnated thereinto. Then, the catalyst was washed well with distilled water and dried again at 80° C. for 3 hours by means of the rotary evaporator to obtain the catalyst. The composition of this catalyst is shown in Table 1.

[Catalyst 4]

Dissolved in 10 ml of demineralized water was 9.49 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 10 mass % of manganese oxide.

Next, 33 g of the carrier described above was impregnated with an aqueous solution prepared by dissolving 0.88 g of ruthenium chloride ($RuCl_3 \cdot nH_2O$, Ru content: 39.16 mass %, manufactured by "TANAKA PRECIOUS METALS"), 1.72 g of cobalt nitrate [$Co(NO_3)_2 \cdot 6H_2O$, manufactured by "Wako Pure Chemicals Industries, Ltd."] and 4.46 g of magnesium nitrate [$Mg(NO_3)_2 \cdot 6H_2O$, manufactured by "Wako Pure Chemicals Industries, Ltd."] in 11 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compounds impregnated thereinto. Then, the catalyst was washed well with distilled water and dried again at 80° C. for 3 hours by means of the rotary evaporator to obtain the catalyst. The composition of this catalyst is shown in Table 1.

[Catalyst 5]

Dissolved in 10 ml of demineralized water was 8.58 g of cerium nitrate [$Ce(NO_3)_3 \cdot 6H_2O$, manufactured by "Wako Pure Chemicals Industries, Ltd."], and 30 g of the alumina carrier (KHO-24, manufactured by "Sumitomo Chemical Co., Ltd.") was impregnated with this solution. Then, the carrier was dried at 120° C. for a night in a dryer, and thereafter it was calcined at 800° C. for 3 hours in the muffle furnace to prepare the alumina carrier containing 10 mass % of cerium oxide.

Next, 33 g of the carrier described above was impregnated with an aqueous solution prepared by dissolving 0.85 g of ruthenium chloride ($RuCl_3 \cdot nH_2O$, Ru content: 39.16 mass %, manufactured by "TANAKA PRECIOUS METALS") in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 6]

Dissolved in 10 ml of demineralized water was 7.17 g of zirconyl nitrate dihydrate [ZrO(NO$_3$)$_2$.2H$_2$O, manufactured by "Wako Pure Chemicals Industries, Ltd."], and 30 g of the alumina carrier (KHO-24, manufactured by "Sumitomo Chemical Co., Ltd.") was impregnated with this solution. Then, the carrier was dried at 120° C. for a night in a dryer, and thereafter it was calcined at 800° C. for 3 hours in the muffle furnace to prepare the alumina carrier containing 10 mass % of zirconium oxide.

Next, 33 g of the carrier described above was impregnated with an aqueous solution prepared by dissolving 0.85 g of ruthenium chloride (RuCl$_3$.nH$_2$O, Ru content: 39.16 mass %, manufactured by "TANAKA PRECIOUS METALS") in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 7]

Dissolved in 12 ml of demineralized water was 0.76 g of ruthenium chloride (RuCl$_3$.nH$_2$O, Ru content: 39.16 mass %, manufactured by "TANAKA PRECIOUS METALS"), and 30 g of the alumina carrier (KHO-24, manufactured by "Sumitomo Chemical Co., Ltd.") was impregnated with this solution. Then, the carrier was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 8]

Dissolved in 10 ml of demineralized water was 9.49 g of manganese acetate [Mn(CH$_3$COO)$_2$.4H$_2$O, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 10 mass % of manganese oxide.

Next, 33 g of the carrier described above was impregnated with an aqueous solution prepared by dissolving 2.2 g of palladium nitrate [Pd(NO$_3$)$_2$, manufactured by "Wako Pure Chemicals Industries, Ltd."] in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 14]

Dissolved in 10 ml of demineralized water was 9.49 g of manganese acetate [Mn(CH$_3$COO)$_2$.4H$_2$O, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 10 mass % of manganese oxide.

Next, 33 g of the carrier described above was impregnated with an aqueous solution prepared by dissolving 2.6 g of rhodium chloride (RhCl$_3$.3H$_2$O, manufactured by "Wako Pure Chemicals Industries, Ltd.") in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 15]

A catalyst was prepared in the same manner as in the preparation of Catalyst 1, except that an amount of ruthenium chloride was changed to 0.425 g. The composition of this catalyst is shown in Table 1.

[Catalyst 9]

A catalyst was prepared in the same manner as in the preparation of Catalyst 1, except that an amount of ruthenium chloride was changed to 2.55 g. The composition of this catalyst is shown in Table 1.

[Catalyst 10]

A catalyst was prepared in the same manner as in the preparation of Catalyst 1, except that an amount of ruthenium chloride was changed to 6.8 g. The composition of this catalyst is shown in Table 1.

[Catalyst 11]

A catalyst was prepared in the same manner as in Catalyst 1, except that an amount of ruthenium chloride was changed to 8.5 g. The composition of this catalyst is shown in Table 1.

[Catalyst 12]

Dissolved in 10 ml of demineralized water was 9.49 g of manganese acetate [Mn(CH$_3$COO)$_2$.4H$_2$O, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 10 mass % of manganese oxide.

Next, 33 g of the carrier described above was impregnated with an aqueous solution prepared by dissolving 6.7 g of nickel chloride (NiCl$_2$.6H$_2$O, manufactured by "Wako Pure Chemicals Industries, Ltd.") in 13 ml of demineralized water, and then it was dried at 80° C. for 3 hours by means of the rotary evaporator. This operation of impregnating and drying was repeated to carry 13.4 g of nickel chloride in total.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 13]

Dissolved in 10 ml of demineralized water was 9.49 g of manganese acetate [Mn(CH$_3$COO)$_2$.4H$_2$O, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 10 mass % of manganese oxide.

Next, 33 g of the carrier described above was impregnated with an aqueous solution prepared by adding 10 ml of the hydrochloric acid solution solving the chloroiridic acid [$H_2IrCl_6$, Ir content: 100 g/liter, manufactured by "Kojima Kagaku Yakuhin Co., Ltd."] to 3 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 16]

Dissolved in 10 ml of demineralized water was 9.49 g of manganese acetate [$Mn(CH_3COO)_2.4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 10 mass % of manganese oxide.

Next, 33 g of the carrier described above was impregnated with an aqueous solution prepared by dissolving 2.7 g of hydrogen hexachloroplatinate (IV) hexahydrate ($H_2PtCl_6.6H_2O$, manufactured by "Wako Pure Chemicals Industries, Ltd.") in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 17]

Dissolved in 12 ml of demineralized water was 6.1 g of nickel chloride ($NiCl_2.6H_2O$, manufactured by "Wako Pure Chemicals Industries, Ltd."), and 30 g of the alumina carrier (KHO-24, manufactured by "Sumitomo Chemical Co., Ltd.") was impregnated with this solution. Then, it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 18]

Dissolved in 12 ml of demineralized water was 2.0 g of palladium nitrate [$Pd(NO_3)_2$, manufactured by "Wako Pure Chemicals Industries, Ltd."], and 30 g of the alumina carrier (KHO-24, manufactured by "Sumitomo Chemical Co., Ltd.") was impregnated with this solution. Then, it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 19]

Dissolved in 12 ml of demineralized water was 2.4 g of rhodium chloride ($RhCl_3.3H_2O$, manufactured by "Wako Pure Chemicals Industries, Ltd."), and 30 g of the alumina carrier (KHO-24, manufactured by "Sumitomo Chemical Co., Ltd.") was impregnated with this solution. Then, it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 20]

The alumina carrier (KHO-24, manufactured by "Sumitomo Chemical Co., Ltd.") 30 g was impregnated with an aqueous solution prepared by adding 10 ml of the hydrochloric acid solution solving the chloroiridic acid [$H_2IrCl_6$, Ir content: 100 g/liter, manufactured by "Kojima Kagaku Yakuhin Co., Ltd."] to 3 ml of demineralized water. Then, it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 21]

Dissolved in 12 ml of demineralized water was 2.4 g of hydrogen hexachloroplatinate(IV)hexahydrate ($H_2PtCl_6.6H_2O$, manufactured by "Wako Pure Chemicals Industries, Ltd."), and 30 g of the alumina carrier (KHO-24, manufactured by "Sumitomo Chemical Co., Ltd.") was impregnated with this solution. Then, it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 22]

Dissolved in 10 ml of demineralized water was 4.75 g of manganese acetate [$Mn(CH_3COO)_2.4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 0.9. Then, the carrier was dried at 120° C. for a night in a dryer, and thereafter it was calcined at 800° C. for 3 hours in the muffle furnace. This catalyst carrier was impregnated again with the solution prepared by dissolving 4.75 g of manganese acetate in 10 ml of demineralized water (in this case, the dissolving water amount ratio was 1.0). Then, the carrier was dried at 120° C. in the dryer for a night, and thereafter it was calcined at 800° C. for 3 hours in the muffle furnace to prepare the alumina carrier containing 10 mass % of manganese oxide.

Next, 30 g of the carrier described above was impregnated with an aqueous solution prepared by dissolving 2.43 g of ruthenium chloride ($RuCl_3 \cdot nH_2O$, Ru content: 39.16 mass %, manufactured by "TANAKA PRECIOUS METALS") in 9.6 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 23]

Dissolved in 9.5 ml of demineralized water was 5.34 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 0.9. Then, the carrier was dried at 120° C. for a night in a dryer, and thereafter it was calcined at 800° C. for 3 hours in the muffle furnace. Then, this impregnation, drying and calcining of manganese acetate was repeated four times in total to prepare the alumina carrier containing 20 mass % of manganese oxide. The dissolving water amount ratios in the second to fourth impregnations of manganese acetate fell in a range of 1.0 to 1.1.

Next, 30 g of the carrier described above was impregnated with an aqueous solution prepared by dissolving 2.43 g of ruthenium chloride ($RuCl_3 \cdot nH_2O$, Ru content: 39.16 mass %, manufactured by "TANAKA PRECIOUS METALS") in 9.6 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 24]

Dissolved in 9.5 ml of demineralized water was 6.10 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 0.9. Then, the carrier was dried at 120° C. for a night in a dryer, and thereafter it was calcined at 800° C. for 3 hours in the muffle furnace. Then, this impregnation, drying and calcining of manganese acetate was repeated six times in total to prepare the alumina carrier containing 30 mass % of manganese oxide. The dissolving water amount ratios in the second to sixth impregnations of manganese acetate fell in a range of 1.0 to 1.2.

Next, 30 g of the carrier described above was impregnated with an aqueous solution prepared by dissolving 2.43 g of ruthenium chloride ($RuCl_3 \cdot nH_2O$, Ru content: 39.16 mass %, manufactured by "TANAKA PRECIOUS METALS") in 6.5 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 25]

Dissolved in 9.5 ml of demineralized water was 6.10 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 0.9. Then, the carrier was dried at 120° C. for a night in a dryer, and thereafter it was calcined at 800° C. for 3 hours in the muffle furnace. Then, this impregnation, drying and calcining of manganese acetate was repeated fourteen times in total to prepare the alumina carrier containing 50 mass % of manganese oxide. The dissolving water amount ratios in the second to fourteenth impregnations of manganese acetate fell in a range of 1.0 to 1.3.

Next, 30 g of the carrier described above was impregnated with an aqueous solution prepared by dissolving 2.43 g of ruthenium chloride ($RuCl_3 \cdot nH_2O$, Ru content: 39.16 mass %, manufactured by "TANAKA PRECIOUS METALS") in 4.5 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 26]

Dissolved in 6.6 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 0.6. Then, the carrier was dried at 120° C. for a night in a dryer, and thereafter it was calcined at 800° C. for 3 hours in the muffle furnace to prepare the alumina carrier containing 6 mass % of manganese oxide.

Next, 30 g of the carrier obtained above was impregnated with an aqueous solution prepared by dissolving 2.36 g of ruthenium chloride ($RuCl_3 \cdot nH_2O$, Ru content: 39.16 mass %, manufactured by "TANAKA PRECIOUS METALS") in 9.45 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 27]

Dissolved in 15.4 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.4. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 26 was carried out to obtain a catalyst. The composition of this catalyst is shown in Table 1.

[Catalyst 28]

Dissolved in 7.7 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 0.7. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 26 was carried out to obtain a catalyst. The composition of this catalyst is shown in Table 1.

[Catalyst 29]

Dissolved in 8.8 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 0.8. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 26 was carried out to obtain a catalyst. The composition of this catalyst is shown in Table 1.

[Catalyst 30]

Dissolved in 9.9 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 0.9. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 26 was carried out to obtain a catalyst. The composition of this catalyst is shown in Table 1.

[Catalyst 31]

Dissolved in 11 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 26 was carried out to obtain a catalyst. The composition of this catalyst is shown in Table 1.

[Catalyst 32]

Dissolved in 12.1 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.1. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 26 was carried out to obtain a catalyst. The composition of this catalyst is shown in Table 1.

[Catalyst 33]

Dissolved in 13.2 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.2. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 26 was carried out to obtain a catalyst. The composition of this catalyst is shown in Table 1.

[Catalyst 34]

Dissolved in 14.3 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24, manufactured by "Sumitomo Chemical Co., Ltd.") was impregnated with this solution. In this case, the dissolving water amount ratio was 1.3. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 26 was carried out to obtain a catalyst. The composition of this catalyst is shown in Table 1.

[Catalyst 35]

Dissolved in 21.5 ml of demineralized water was 5.45 g of manganese acetate [$Mn(CH_3COO)_2 \cdot 4H_2O$, manufactured by "Wako Pure Chemicals Industries, Ltd."], and 30 g of an alumina carrier (NA-3, manufactured by "Nikki Universal Co., Ltd.") was impregnated with this solution. In this case, the dissolving water amount ratio was 0.6. Then, the carrier was dried at 120° C. for a night in a dryer, and thereafter it was calcined at 800° C. for 3 hours in the muffle furnace to prepare the alumina carrier containing 6 mass % of manganese oxide.

Next, the carrier obtained above was impregnated with an aqueous solution prepared by dissolving 3.18 g of ruthenium chloride ($RuCl_3 \cdot nH_2O$, Ru content: 39.16 mass %, manufactured by "TANAKA PRECIOUS METALS") in 27 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, 400 ml of water containing 7.5 mass % of hydrazine was dropwise added in 30 minutes and stirred at a room-temperature for 4 hours. Subsequently, the catalyst was washed well with distilled water and dried again at 80° C. for 3 hours by means of the rotary evaporator to obtain the catalyst. The composition of this catalyst is shown in Table 1.

[Catalyst 36]

Dissolved in 50.3 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (NA-3, manufactured by "Nikki Universal Co., Ltd.") was impregnated with this solution. In this case, the dissolving water amount ratio was 1.4. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 35 was carried out to obtain a catalyst. The composition of this catalyst is shown in Table I.

[Catalyst 37]

Dissolved in 25.1 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (NA-3, manufactured by "Nikki Universal Co., Ltd.") was impregnated with this solution. In this case, the dissolving water amount ratio was 0.7. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 35 was carried out to obtain a catalyst. The composition of this catalyst is shown in Table 1.

[Catalyst 38]

Dissolved in 28.7 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (NA-3, manufactured by "Nikki Universal Co., Ltd.") was impregnated with this solution. In this case, the dissolving water amount ratio was 0.8. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 35 was carried out to obtain a catalyst. The composition of this catalyst is shown in Table 1.

[Catalyst 39]

Dissolved in 32.3 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (NA-3, manufactured by "Nikki Universal Co., Ltd.") was impregnated with this solution. In this case, the dissolving water amount ratio was 0.9. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 35 was carried out to obtain a catalyst. The composition of this catalyst is shown in Table 1.

[Catalyst 40]

Dissolved in 35.9 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (NA-3, manufactured by "Nikki Universal Co., Ltd.") was impregnated with this solution. In this case, the dissolving water amount ratio was 1.0. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 35 was carried out to obtain a catalyst. The composition of this catalyst is shown in Table 1.

[Catalyst 41]

Dissolved in 39.4 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (NA-3, manufactured by "Nikki Universal Co., Ltd." was impregnated with this solution. In this case, the dissolving water amount ratio was 1.1. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 35 was carried out to obtain a catalyst. The composition of this catalyst is shown in Table 1.

[Catalyst 42]

Dissolved in 43.1 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (NA-3, manufactured by "Nikki Universal Co., Ltd.") was impregnated with this solution. In this case, the dissolving water amount ratio was 1.2. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 35 was carried out to obtain a catalyst. The composition of this catalyst is shown in Table 1.

[Catalyst 43]

Dissolved in 46.6 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (NA-3, manufactured by "Nikki Universal Co., Ltd.") was impregnated with this solution. In this case, the dissolving water amount ratio was 1.3. Then, the carrier was dried at 120° C. for a night in a dryer, and thereafter it was calcined at 800° C. for 3 hours in the muffle furnace to prepare the alumina carrier containing 6 mass % of manganese oxide. Then, the same operation as in the production of Catalyst 35 was carried out to obtain a catalyst. The composition of this catalyst is shown in Table 1.

[Catalyst 44]

Dissolved in 10 ml of demineralized water was 5.45 g of manganese acetate [$Mn(CH_3COO)_2 \cdot 4H_2O$, manufactured by "Wako Pure Chemicals Industries, Ltd."], and 30 g of the alumina carrier (KHO-24 calcined at 850° C. for 5 hours in the air, manufactured by "Sumitomo Chemical Co., Ltd.") was impregnated with this solution. Then, the carrier was dried at 120° C. for a night in a dryer, and thereafter it was calcined at 800° C. for 3 hours in the muffle furnace to prepare the alumina carrier containing 6 mass % of manganese oxide.

Next, the carrier obtained above was impregnated with an aqueous solution prepared by dissolving 2.55 g of ruthenium chloride ($RuCl_3 \cdot nH_2O$, Ru content: 39.16 mass %, manufactured by "TANAKA PRECIOUS METALS") in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 45]

The same operation as in the preparation of Catalyst 44 was carried out, except that the calcining condition of the alumina was changed from 850° C. to 900° C. The composition of this catalyst is shown in Table 1.

[Catalyst 46]

The same operation as in the preparation of Catalyst 44 was carried out, except that the calcining condition of the alumina was changed from 850° C. to 1,000° C. The composition of this catalyst is shown in Table 1.

[Catalyst 47]

The same operation as in the preparation of Catalyst 44 was carried out, except that the calcining condition of the alumina was changed from 850° C. to 1,100° C. The composition of this catalyst is shown in Table 1.

[Catalyst 48]

The same operation as in the preparation of Catalyst 44 was carried out, except that the calcining condition of the alumina was changed from 850° C. to 700° C. The composition of this catalyst is shown in Table 1.

[Catalyst 49]

The same operation as in the preparation of Catalyst 44 was carried out, except that the calcining condition of the alumina was changed from 850° C. to 1,250° C. The composition of this catalyst is shown in Table 1.

[Catalyst 50]

Dissolved in 10 ml of demineralized water was 5.45 g of manganese acetate [Mn(CH$_3$COO)$_2$.4H$_2$O, manufactured by "Wako Pure Chemicals Industries, Ltd."], and 30 g of the alumina carrier (KHO-24, manufactured by "Sumitomo Chemical Co., Ltd.") was impregnated with this solution. Then, the carrier was dried at 120° C. for a night in a dryer, and thereafter it was calcined at 1,000° C. for 3 hours in the muffle furnace to prepare the alumina carrier containing 6 mass % of manganese oxide.

Next, the carrier obtained above was impregnated with an aqueous solution prepared by dissolving 2.55 g of ruthenium chloride (RuCl$_3$.nH$_2$O, Ru content: 39.16 mass manufactured by "TANAKA PRECIOUS METALS") in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 51]

Dissolved in 10 ml of demineralized water was 11.0 g of manganese nitrate [Mn(NO$_3$)$_2$.6H$_2$O, manufactured by "Wako Pure Chemicals Industries, Ltd."], and 30 g of the alumina carrier (KHO-24, manufactured by "Sumitomo Chemical Co., Ltd.") was impregnated with this solution. Then, the carrier was dried at 120° C. for a night in a dryer, and thereafter it was calcined at 850° C. for 3 hours in the muffle furnace to prepare the alumina carrier containing 10 mass % of manganese oxide.

Next, the carrier obtained above was impregnated with an aqueous solution prepared by dissolving 2.55 g of ruthenium chloride (RuCl$_3$.nH$_2$O, Ru content: 39.16 mass manufactured by "TANAKA PRECIOUS METALS") in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 52]

The same operation as in the preparation of Catalyst 51 was carried out, except that the calcining condition of the alumina carried thereon with the manganese compound was changed from 850° C. to 900° C. The composition of this catalyst is shown in Table 1. A powder X ray diffraction diagram (2. theta.=20 to 80. degree.) obtained by powder X ray diffraction measurement of this catalyst is shown in FIG. 1, and a diffraction peak of α-alumina phase is present. The measurement conditions thereof are the same as described above.

[Catalyst 53]

The same operation as in the preparation of Catalyst 51 was carried out, except that the calcining condition of the alumina carried thereon with the manganese compound was changed from 850° C. to 1,000° C. The composition of this catalyst is shown in Table 1. An X ray diffraction diagram (2. theta.=20 to 80. degree.) obtained by powder X ray diffraction measurement of this catalyst is shown in FIG. 1, and a diffraction peak of α-alumina phase is present. The measurement conditions thereof are the same as described above.

[Catalyst 54]

The same operation as in the preparation of Catalyst 51 was carried out, except that the calcining condition of the alumina carried thereon with the manganese compound was changed from 850° C. to 700° C. The composition of this catalyst is shown in Table 1. An X ray diffraction diagram (2. theta.=20 to 80. degree.) obtained by powder X ray diffraction measurement of this catalyst is shown in FIG. 1, and a diffraction peak of α-alumina phase is not present. The measurement conditions thereof are the same as described above.

[Catalyst 55]

Dissolved in 10 ml of demineralized water was 5.45 g of manganese acetate [Mn(CH$_3$COO)$_2$.4H$_2$O, manufactured by "Wako Pure Chemicals Industries, Ltd."], and 30 g of an alumina carrier (Cataloid-AP, calcined in the air at 500° C. for 5 hours, manufactured by "Shokubai Kasei Ind. Co., Ltd.") was impregnated with this solution. Then, the carrier was dried at 120° C. for a night in a dryer, and thereafter it was calcined at 1,000° C. for 3 hours in the muffle furnace to prepare the alumina carrier containing 6 mass % of manganese oxide.

Next, the carrier obtained above was impregnated with an aqueous solution prepared by dissolving 2.55 g of ruthenium chloride (RuCl$_3$.nH$_2$O, Ru content: 39.16 mass manufactured by "TANAKA PRECIOUS METALS") in 13 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compound impregnated thereinto. Then, the catalyst was washed well with distilled water and dried again at 80° C. for 3 hours by means of the rotary evaporator to obtain the catalyst. The composition of this catalyst is shown in Table 1.

[Catalyst 56]

The same operation as in the preparation of Catalyst 55 was carried out, except that the calcining condition of the alumina carried thereon with the manganese compound was changed from 1,000° C. to 700° C. The composition of this catalyst is shown in Table 1.

[Catalyst 57]

Dissolved in 10 ml of demineralized water was 9.4.9 g of manganese acetate [Mn(CH$_3$COO)$_2$.4H$_2$O, manufactured by "Wako Pure Chemicals Industries, Ltd."], and 30 g of the alumina carrier (KHO-24, manufactured by "Sumitomo Chemical Co., Ltd.") was impregnated with this solution. Then, the carrier was dried at 120° C. for a night in a dryer, and thereafter it was calcined at 900° C. for 3 hours in the muffle furnace to prepare the alumina carrier containing 10 mass % of manganese oxide.

Next, the carrier obtained above was impregnated with an aqueous solution prepared by dissolving 0.87 g of ruthenium chloride (RuCl$_3$.nH$_2$O, Ru content: 39.16 mass %, manufactured by "TANAKA PRECIOUS METALS"), 1.72 g of cobalt nitrate [Co(NO$_3$)$_2$.6H$_2$O, manufactured by "Wako Pure Chemicals Industries, Ltd."] and 4.46 g of magnesium nitrate [Mg(NO$_3$)$_2$.6H$_2$O, manufactured by "Wako Pure Chemicals Industries, Ltd."] in 11 ml of demineralized water, and then it was dried at 80° C. for 3 hours by means of the rotary evaporator.

Subsequently, the catalyst described above was dipped in one liter of a 5N sodium hydroxide solution and slowly stirred for one hour to decompose the compounds impregnated thereinto. Then, the catalyst was washed well with distilled water and dried again at 80° C. for 3 hours by means of the rotary evaporator to obtain the catalyst. The composition of this catalyst is shown in Table 1.

[Catalyst 58]

The same operation as in the preparation of Catalyst 57 was carried out, except that the calcining condition of the alumina carried thereon with the manganese compound was changed from 900° C. to 700° C. The composition of this catalyst is shown in Table 1.

In Table 1, the amount of the active metal shows mass parts per 100 mass parts of the carrier in terms of metal.

TABLE 1

| Catalyst composition | Catalyst |   |   |   |   |   |   |
|---|---|---|---|---|---|---|---|
|  | 1 | 2 | 3 | 4 | 5 | 6 | 7 |
| Ru (mass part) | 1 | 1 | 1 | 1 | 1 | 1 | 1 |
| Co (mass part) | — | 1 | — | 1 | — | — | — |
| Mg (mass part) | — | — | 2 | 2 | — | — | — |
| $CeO_2$ (mass %) | — | — | — | — | 10 | — | — |
| $ZrO_2$ (mass %) | — | — | — | — | — | 10 | — |
| $MnO_2$ (mass %) | 10 | 10 | 10 | 10 | — | — | — |
| $Al_2O_3$ (mass %) | 90 | 90 | 90 | 90 | 90 | 90 | 100 |

| Catalyst composition | Catalyst |   |   |   |   |   |   |
|---|---|---|---|---|---|---|---|
|  | 8 | 9 | 10 | 11 | 12 | 13 | 14 |
| Ru (mass part) | 0.5 | 3 | 8 | 10 | — | — | — |
| Ni (mass part) | — | — | — | — | 10 | — | — |
| Pd (mass part) | — | — | — | — | — | 3 | — |
| Rh (mass part) | — | — | — | — | — | — | 3 |
| Ir (mass part) | — | — | — | — | — | — | — |
| Pt (mass part) | — | — | — | — | — | — | — |
| $MnO_2$ (mass %) | 10 | 10 | 10 | 10 | 10 | 10 | 10 |
| $Al_2O_3$ (mass %) | 90 | 90 | 90 | 90 | 90 | 90 | 90 |

| Catalyst composition | Catalyst |   |   |   |   |   |   |
|---|---|---|---|---|---|---|---|
|  | 15 | 16 | 17 | 18 | 19 | 20 | 21 |
| Ru (mass part) | — | — | — | — | — | — | — |
| Ni (mass part) | — | — | 10 | — | — | — | — |
| Pd (mass part) | — | — | — | 3 | — | — | — |
| Rh (mass part) | — | — | — | — | 3 | — | — |
| Ir (mass part) | 3 | — | — | — | — | 3 | — |
| Pt (mass part) | — | 3 | — | — | — | — | 3 |
| $MnO_2$ (mass %) | 10 | 10 | — | — | — | — | — |
| $Al_2O_3$ (mass %) | 90 | 90 | 100 | 100 | 100 | 100 | 100 |

| Catalyst composition | Catalyst |   |   |   |   |   |
|---|---|---|---|---|---|---|
|  | 22 | 23 | 24 | 25 | 26 to 34 | 35 to 43 |
| Ru (mass part) | 3 | 3 | 3 | 3 | 3 | 4 |
| Ni (mass part) | — | — | — | — | — | — |
| Pd (mass part) | — | — | — | — | — | — |
| Rh (mass part) | — | — | — | — | — | — |
| Ir (mass part) | — | — | — | — | — | — |
| Pt (mass part) | — | — | — | — | — | — |
| $MnO_2$ (mass %) | 10 | 20 | 30 | 50 | 6 | 6 |
| $Al_2O_3$ (mass %) | 90 | 80 | 70 | 50 | 94 | 94 |

| Catalyst composition | Catalyst |   |   |   |
|---|---|---|---|---|
|  | 44 to 50 | 51 to 54 | 55 to 56 | 57 to 58 |
| Ru (mass part) | 3 | 3 | 3 | 1 |
| Co (mass part) | — | — | — | 1 |
| Mg (mass part) | — | — | — | 2 |
| $MnO_2$ (mass %) | 6 | 10 | 6 | 10 |
| $Al_2O_3$ (mass %) | 94 | 90 | 94 | 90 |

Examples 1 to 4 and Comparative Examples 1 to 3

Steam Reforming

SiC 3.5 ml was added to 1.5 ml of the respective catalysts (Catalysts 1 to 7) which were crushed to a diameter of 0.5 to 1 mm, and a quartz reaction tube having an inner diameter of 20 mm was charged with the mixture thereof. The catalyst was subjected to hydrogen reduction treatment at 600° C. for one hour in hydrogen flow in the reaction tube, and then commercial JIS No. 1 kerosene which was desulfurized to a sulfur content of 0.1 ppm or less was used as a raw material hydrocarbon to introduce the JIS No. 1 kerosene and steam thereinto on the conditions of LHSV of 9.5 $hr^{-1}$ and steam/carbon (mole ratio) of 1.5, whereby steam reforming reaction (accelerated deterioration test) was carried out at an atmospheric pressure and a reaction temperature of 600° C. (central part of the catalyst layer). Gas obtained one hour later was sampled to measure a composition and a concentration thereof by means of gas chromatography. Based on this result, the C1 conversion rate was determined from the following equation. The results thereof are shown in Table 2. The reaction was carried out without carrying out hydrogen reduction in Example 1-2, Comparative Example 1-2, Comparative Example 2-2 and Comparative Example 3-2.

C1 conversion rate (%)=(A/B)×100 wherein A is CO mole flow amount+$CO_2$ mole flow amount+$CH_4$ mole flow amount (flow amounts at the outlet of the reactor in all cases), and B is a carbon mole flow amount of kerosene at the inlet of the reactor.

After finishing the experiments, an amount of a carbon content deposited in the catalyst was measured. The results thereof are shown in Table 2.

TABLE 2

| | Steam reforming | | |
|---|---|---|---|
| | Catalyst | C1 conversion rate (%) | Deposited carbon amount (mass %) |
| Example 1-1 | 1 | 51.6 | 0.2 |
| Example 1-2 | 1 | 48.1 | 0.2 |
| Example 2 | 2 | 54.8 | 0.2 |
| Example 3 | 3 | 49.6 | 0.1 |
| Example 4 | 4 | 53.4 | 0.1 |
| Comparative Example 1-1 | 5 | 38.1 | 0.4 |
| Comparative Example 1-2 | 5 | 35.4 | 0.4 |
| Comparative Example 2-1 | 6 | 32.1 | 0.5 |
| Comparative Example 2-2 | 6 | 30.8 | 0.5 |
| Comparative Example 3-1 | 7 | 27.6 | 0.9 |
| Comparative Example 3-2 | 7 | 25.9 | 1.0 |

Examples 5 to 17 and Comparative Examples 4 to 8

Steam Reforming

SiC 3.5 ml was added to 1.5 ml of the respective catalysts (Catalysts 8 to 19) which were crushed to a diameter of 0.5 to 1 mm, and a quartz reaction tube having an inner diameter of 20 mm was charged with the mixture thereof. The catalyst was subjected to hydrogen reduction treatment at 600° C. for one hour in hydrogen flow in the reaction tube, and then commercial JIS No. 1 kerosene which was desulfurized to a sulfur content of 0.1 ppm or less was used as a raw material hydrocarbon to introduce the JIS No. 1 kerosene and steam thereinto on the conditions of LHSV of 6 hr$^{-1}$ and steam/carbon (mole ratio) of 3, whereby steam reforming reaction (accelerated deterioration test) was carried out at an atmospheric pressure and a reaction temperature of 580° C. (central part of the catalyst layer). Gas obtained one hour later was sampled to determine a C1 conversion rate in the same manner as described above. The results thereof are shown in Table 3.

TABLE 3

Steam reforming

| | Catalyst | C1 conversion rate (%) |
|---|---|---|
| Example 5 | 8 | 37.1 |
| Example 6 | 9 | 76.6 |
| Example 7 | 10 | 80.2 |
| Example 8 | 11 | 80.0 |
| Example 9 | 12 | 44.7 |
| Example 10 | 13 | 34.5 |
| Example 11 | 14 | 41.9 |
| Example 12 | 15 | 38.9 |
| Example 13 | 16 | 41.8 |
| Comparative Example 4 | 17 | 15.4 |
| Comparative Example 5 | 18 | 10.4 |
| Comparative Example 6 | 19 | 13.3 |
| Comparative Example 7 | 20 | 12.5 |
| Comparative Example 8 | 21 | 13.0 |
| Example 14 | 22 | 77.3 |
| Example 15 | 23 | 98.1 |
| Example 16 | 24 | 98.9 |
| Example 17 | 25 | 99.7 | mine a C1 conversion rate or an HC conversion rate. The C1 conversion rate was determined in the manner as described above, and the HC conversion rate was determined from the following equation. The results thereof are shown in Table 5.

HC conversion rate (%)={1−(number of carbon atoms of hydrocarbon in the product/number of carbon atoms of hydrocarbon in the raw material)}×100

The composition of naphtha used is shown in Table 4.

TABLE 4

| Composition of desulfurized naphtha (mass %) | | | | |
|---|---|---|---|---|
| Carbon number in molecule | Paraffin | Naphthene | Aromatic | Total |
| 5 | 0.4 | 0.1 | — | 0.5 |
| 6 | 12.0 | 4.3 | 0.7 | 17.0 |
| 7 | 34.6 | 9.6 | 4.8 | 49.0 |
| 8 | 13.8 | 5.2 | 4.4 | 23.4 |
| 9 | 7.2 | 1.8 | 0.7 | 9.7 |
| 10 or more | 0.2 | 0.1 | 0.1 | 0.4 |
| Total | 68.2 | 21.1 | 10.7 | 100.0 |
| Sulfur content | 20 ppb or less | | | |

TABLE 5

Steam reforming

| | Catalyst | Raw material | SV (hr$^{-1}$) | S/C | Temperature (° C.) | Conversion rate (%) |
|---|---|---|---|---|---|---|
| Example 18 | 1 | Propane | 7,000 | 3 | 500 | 95.5 |
| Comparative Example 9 | 7 | Propane | 7,000 | 3 | 500 | 45.1 |
| Example 19 | 1 | Naphtha | 9.5 | 1.5 | 600 | 52.4 |
| Comparative Example 10 | 7 | Naphtha | 9.5 | 1.5 | 600 | 29.6 |
| Example 20 | 1 | Methane | 8,000 | 3 | 650 | 62.2 |
| Comparative Example 11 | 7 | Methane | 8,000 | 3 | 650 | 33.7 |

Remarks
SV: GHSV in the case of methane and propane and LHSV in the case of naphtha
S/C: steam/carbon (mole ratio)
Conversion rate: C1 conversion rate in the case of propane and naphtha and HC conversion rate in the case of methane Examples 18 to 20 and Comparative Examples 9 to 11

Steam Reforming

SiC 3.5 ml was added to 1.5 ml of the respective catalysts (Catalysts 1 and 7) which were crushed to a diameter of 0.5 to 1 mm, and a quartz reaction tube having an inner diameter of 20 mm was charged with the mixture thereof. The catalyst was subjected to hydrogen reduction treatment at 600° C. for one hour in hydrogen flow in the reaction tube, and then hydrocarbons shown in Table 5 were used as the raw materials to carry out steam reforming reaction (accelerated deterioration test) at an atmospheric pressure on the conditions shown in Table 5. Gas obtained one hour later was sampled to determine a C1 conversion rate or an HC conversion rate. The C1

Examples 21 and 22 and Comparative Examples 12 and 13

Self Thermal Reforming

SiC 3.5 ml was added to 1.5 ml of the respective catalysts (Catalysts 1 and 7) which were crushed to a diameter of 0.5 to 1 mm, and a quartz reaction tube having an inner diameter of 20 mm was charged with the mixture thereof. The catalyst was subjected to hydrogen reduction treatment at 600° C. for one hour in hydrogen flow in the reaction tube, and then hydrocarbons shown in Table 6 were used as the raw materials to carry out self thermal reforming reaction at an atmospheric pressure on the conditions shown in Table 6. Gas obtained one hour later was sampled to determine an HC conversion rate in the manner as described above. The results thereof are shown in Table 6.

TABLE 6

| | Catalyst | Raw material | SV (hr$^{-1}$) | S/C | O$_2$/C | CO$_2$/C | Temperature (° C.) | HC conversion rate (%) |
|---|---|---|---|---|---|---|---|---|
| | | | Self thermal reforming | | | | | |
| Example 21 | 1 | Naphtha | 5 | 2.5 | 0.4 | — | 800 | 88.8 |
| Comparative Example 12 | 7 | Naphtha | 5 | 2.5 | 0.4 | — | 800 | 57.7 |
| Example 22 | 1 | Methane | 25,000 | 0.6 | 0.6 | 0.12 | 1,000 | 82.5 |
| Comparative Example 13 | 7 | Methane | 25,000 | 0.6 | 0.6 | 0.12 | 1,000 | 44.6 |

Remarks
SV: GHSV in the case of methane and LHSV in the case of naphtha
S/C: steam/carbon (mole ratio)
O$_2$/C: oxygen/carbon (mole ratio)
CO$_2$/C: carbon dioxide/carbon (mole ratio)

Examples 23 and 24 and Comparative Examples 14 and 15

Partial Oxidation Reforming

SiC 3.5 ml was added to 1.5 ml of the respective catalysts (Catalysts 1 and 7) which were crushed to a diameter of 0.5 to 1 mm, and a quartz reaction tube having an inner diameter of 20 mm was charged with the mixture thereof. The catalyst was subjected to hydrogen reduction treatment at 600° C. for one hour in hydrogen flow in the reaction tube, and then hydrocarbons shown in Table 7 were used as the raw materials to carry out partial oxidation reforming reaction at an atmospheric pressure on the conditions shown in Table 7. Gas obtained one hour later was sampled to determine a naphtha conversion rate or an HC conversion rate. The HC conversion rate was determined in the manner as described above, and the naphtha conversion rate was determined from the following equation. The results thereof are shown in Table 7.

Naphtha conversion rate (%)={1−(mass of naphtha in the product/mass of raw material naphtha)}×100

The same naphtha as described above was used.

Example 25 and Comparative Example 16

Carbon Dioxide Reforming

SiC 3.5 ml was added to 1.5 ml of the respective catalysts (Catalysts 1 and 7) which were crushed to a diameter of 0.5 to 1 mm, and a quartz reaction tube having an inner diameter of 20 mm was charged with the mixture thereof. The catalyst was subjected to hydrogen reduction treatment at 600° C. for one hour in hydrogen flow in the reaction tube, and then hydrocarbon shown in Table 8 was used as the raw material to carry out carbon dioxide reforming reaction at an atmospheric pressure on the conditions shown in Table 8. Gas obtained one hour later was sampled to determine a CO yield. The CO yield was determined from the following equation. The results thereof are shown in Table 8.

CO yield (%)={(mole number of CO in the product/mole number of CO$_2$ and CH$_4$ in the raw material)}×100

TABLE 7

| | Catalyst | Raw material | SV (hr$^{-1}$) | O$_2$/C | Temperature (° C.) | HC conversion rate (%) |
|---|---|---|---|---|---|---|
| | | | Partial oxidation reforming | | | |
| Example 23 | 1 | Naphtha | 15 | 0.5 | 700 | 99.9 |
| Comparative Example 14 | 7 | Naphtha | 15 | 0.5 | 700 | 84.8 |
| Example 24 | 1 | Methane | 5,000 | 0.5 | 700 | 73.6 |
| Comparative Example 15 | 7 | Methane | 5,000 | 0.5 | 700 | 48.0 |

Remarks
SV: GHSV in the case of methane and LHSV in the case of naphtha
O$_2$/C: oxygen/carbon (mole ratio)
Coversion rate: naphtha conversion rate in the case of naphtha and HC conversion rate in the case of methane

TABLE 8

Partial oxidation reforming

| | Catalyst | Raw material | SV (hr$^{-1}$) | CO$_2$/C | Temperature (° C.) | CO yield (%) |
|---|---|---|---|---|---|---|
| Example 25 | 1 | Methane | 25,000 | 1 | 780 | 82.0 |
| Comparative Example 16 | 7 | Methane | 25,000 | 1 | 780 | 58.6 |

Remarks
SV: GHSV
CO$_2$/C: carbon dioxide/carbon (mole ratio)

Examples 26 to 34

Steam Reforming

SiC 3.5 ml was added to 1.5 ml of the respective catalysts (Catalysts 26 to 34) which were crushed to a diameter of 0.5 to 1 mm, and a quartz reaction tube having an inner diameter of 20 mm was charged with the mixture thereof. The catalyst was subjected to hydrogen reduction treatment at 600° C. for one hour in hydrogen flow in the reaction tube, and then the commercial JIS No. 1 kerosene which was desulfurized to a sulfur content of 0.1 ppm or less was used as a raw material hydrocarbon to introduce the JIS No. 1 kerosene and steam thereinto on the conditions of LHSV of 9.5 hr$_{-1}$ and steam/carbon (mole ratio) of 1.5, whereby steam reforming reaction (accelerated deterioration test) was carried out at an atmospheric pressure and a reaction temperature of 600° C. (central part of the catalyst layer). Gas obtained one hour later was sampled to determine a C1 conversion rate in the same manner as described above. The results thereof are shown in Table 9.

TABLE 9

Steam reforming

| | Catalyst | C1 conversion rate (%) |
|---|---|---|
| Example 26 | 26 | 63.0 |
| Example 27 | 27 | 66.5 |
| Example 28 | 28 | 70.0 |
| Example 29 | 29 | 71.4 |
| Example 30 | 30 | 73.0 |
| Example 31 | 31 | 72.2 |
| Example 32 | 32 | 75.9 |
| Example 33 | 33 | 74.0 |
| Example 34 | 34 | 73.5 |

Examples 35 to 43

Steam Reforming

SiC 3.5 ml was added to 1.5 ml of the respective catalysts (Catalysts 35 to 43) which were crushed to a diameter of 0.5 to 1 mm, and a quartz reaction tube having an inner diameter of 20 mm was charged with the mixture thereof. The catalyst was not subjected to hydrogen reduction treatment, and the commercial JIS No. 1 kerosene (desulfurized to a sulfur content of 0.1 ppm or less) was used as a raw material hydrocarbon to introduce the JIS No. 1 kerosene and steam thereinto on the conditions of LHSV of 9.5 hr$^{-1}$ and steam/carbon (mole ratio) of 1.5, whereby steam reforming reaction (accelerated deterioration test) was carried out at an atmospheric pressure and a reaction temperature of 600° C. (central part of the catalyst layer). Gas obtained one hour later was sampled to determine a C1 conversion rate in the same manner as described above. The results thereof are shown in Table 10.

TABLE 10

Steam reforming

| | Catalyst | C1 conversion rate (%) |
|---|---|---|
| Example 35 | 35 | 66.5 |
| Example 36 | 36 | 67.0 |
| Example 37 | 37 | 73.8 |
| Example 38 | 38 | 74.7 |
| Example 39 | 39 | 74.8 |
| Example 40 | 40 | 76.8 |
| Example 41 | 41 | 78.4 |
| Example 42 | 42 | 77.4 |
| Example 43 | 43 | 74.0 |

Examples 44 to 54 57 and 58

Steam Reforming

A quartz reaction tube having an inner diameter of 20 mm was charged with 1.5 ml of the respective catalysts (Catalysts 44 to 54, 57 and 58) which remained spherical. The catalyst was subjected to hydrogen reduction treatment at 600° C. for one hour in hydrogen flow in the reaction tube, and then the commercial JIS No. 1 kerosene which was desulfurized to a sulfur content of 0.1 ppm or less was used as a raw material hydrocarbon to introduce the JIS No. 1 kerosene and steam thereinto on the conditions of LHSV of 4.5 hr$^{-1}$ and steam/carbon (mole ratio) of 1.5, whereby steam reforming reaction (accelerated deterioration test) was carried out at an atmospheric pressure and a reaction temperature of 600° C. (central part of the catalyst layer). Gas obtained one hour later was sampled to determine a C1 conversion rate in the same manner as described above. The results thereof are shown in Table 11.

Examples 55 and 56

Steam Reforming

SiC 3.5 ml was added to 1.5 ml of the respective catalysts (Catalysts 55 and 56) which were crushed to a diameter of 0.5 to 1 mm, and a quartz reaction tube having an inner diameter of 20 mm was charged with the mixture thereof. The catalyst was subjected to hydrogen reduction treatment at 600° C. for one hour in hydrogen flow in the reaction tube, and then the commercial JIS No. 1 kerosene which was desulfurized to a sulfur content of 0.1 ppm or less was used as a raw material hydrocarbon to introduce the JIS No. 1 kerosene and steam thereinto on the conditions of LHSV of 9.5 hr$^{-1}$ and steam/carbon (mole ratio) of 1.5, whereby steam reforming reaction (accelerated deterioration test) was carried out at an atmospheric pressure and a reaction temperature of 600° C. (central part of the catalyst layer). Gas obtained one hour later was sampled to determine a C1 conversion rate in the same manner as described above. The results thereof are shown in Table 11.

TABLE 11

Steam reforming

| | Catalyst | C1 conversion rate (%) |
|---|---|---|
| Example 44 | 44 | 77.7 |
| Example 45 | 45 | 80.2 |
| Example 46 | 46 | 86.2 |
| Example 47 | 47 | 81.9 |
| Example 48 | 48 | 72.0 |
| Example 49 | 49 | 70.5 |
| Example 50 | 50 | 89.3 |
| Example 51 | 51 | 76.9 |

TABLE 11-continued

Steam reforming

| Catalyst | C1 conversion rate (%) |
|---|---|
| Example 52  52 | 81.6 |
| Example 53  53 | 86.7 |
| Example 54  54 | 67.5 |
| Example 55  55 | 67.2 |
| Example 56  56 | 62.6 |
| Example 57  57 | 72.2 |
| Example 58  58 | 66.8 |

The reforming catalyst of the present invention is used to carry out reforming reaction (steam reforming, self thermal reforming, partial oxidation reforming and carbon dioxide reforming) for a hydrocarbon, whereby gas rich in hydrogen and synthetic gas can efficiently be obtained.

The invention claimed is:

1. A process, comprising performing steam reforming of a hydrocarbon in the presence of a catalyst, wherein the catalyst comprises:
- a carrier comprising manganese oxide in an amount of from 5 to 95 mass %; and
- at least one component carried on the carrier comprising a ruthenium component.

2. The process of claim 1, wherein the at least one component carried on the carrier further comprises at least one of:
- a cobalt component; and
- at least one component selected from the group consisting of an alkaline metal component, an alkaline earth metal component and a rare earth metal component.

3. The process of claim 1, wherein the carrier comprises manganese oxide and alumina.

4. The process of claim 3, wherein an X-ray diffraction spectrum of the alumina includes a diffraction peak of an α-alumina phase.

5. The process of claim 1, wherein the at least one component carried on the carrier is present in an amount of 0.1 to 8 mass parts of metal per 100 mass parts of the carrier.

6. A process, comprising reforming a hydrocarbon in the presence of a catalyst by a method selected from the group consisting of self thermal reforming, partial oxidation reforming, and carbon dioxide reforming, wherein the catalyst comprises:
- a carrier comprising manganese oxide in an amount of from 5 to 95 mass %; and
- at least one component carried on the carrier comprising a ruthenium component.

7. The process of claim 6, wherein the at least one component carried on the carrier further comprises at least one of:
- a cobalt component; and
- at least one component selected from the group consisting of an alkaline metal component, an alkaline earth metal component and a rare earth metal component.

8. The process of claim 6, wherein the carrier comprises manganese oxide and alumina.

9. The process of claim 8, wherein an X-ray diffraction spectrum of the alumina includes a diffraction peak of an α-alumina phase.

10. The process of claim 6, wherein the at least one component carried on the carrier is present in an amount of 0.1 to 8 mass parts of metal per 100 mass parts of the carrier.

* * * * *